United States Patent [19]

Itzkan et al.

[11] 4,289,397

[45] Sep. 15, 1981

[54] LASER CEILOMETER SIGNAL PROCESSING MEANS

[75] Inventors: Irving Itzkan, Boston; Herbert P. Kent, Swampscott; Michael E. Mack, Manchester, all of Mass.; Richard G. Morton, Richland, Wash.

[73] Assignee: Avco Everett Research Laboratory, Inc., Everett, Mass.

[21] Appl. No.: 59,440

[22] Filed: Jul. 20, 1979

[51] Int. Cl.³ .................. G01C 3/08; G06J 7/12; G06G 7/18

[52] U.S. Cl. .................. 356/5; 333/19; 333/166; 343/17.1 R; 364/605; 364/732; 364/828; 375/96; 375/103; 356/4

[58] Field of Search .................. 356/4, 5; 343/17.1 R, 343/5 CE, 5 W; 333/19, 166; 375/11, 96, 103; 364/605, 732, 828

[56] References Cited

U.S. PATENT DOCUMENTS

| | | | |
|---|---|---|---|
| 3,223,999 | 12/1965 | Groginsky | 343/17.1 R |
| 3,249,940 | 5/1966 | Erickson | 343/17.1 R |
| 3,268,892 | 8/1966 | Atlas | 343/17.1 R |
| 3,438,034 | 4/1969 | Carre et al. | 343/17.1 R |
| 3,741,655 | 6/1973 | Ling et al. | 356/5 |
| 3,899,666 | 8/1975 | Bolger | 375/11 |
| 3,949,206 | 4/1976 | Edwards et al. | 333/166 |
| 3,963,347 | 6/1976 | Segre et al. | 356/5 |
| 4,015,257 | 3/1977 | Fetter | 343/5 W |
| 4,053,227 | 10/1977 | Bodlaj | 356/5 |

OTHER PUBLICATIONS

S. Moskowitz et al., *Pulse Techniques*, Prentice-Hall, 1951, pp. 79-81 and 161-164.

P. A. Davis, *Applied Optics*, vol. 8, No. 10, 10-1968, pp. 2099-2102, 356-365.

*Primary Examiner*—S. C. Buczinski
*Attorney, Agent, or Firm*—M. E. Frederick

[57] ABSTRACT

For use in a pulsed-laser lidar such as a laser ceilometer, there are shown several examples of signal processing means for separating desired pulses due to targets such as clouds from strong background signals due to suspended particles causing poor visibility. The several examples belong to a class of means having the property of applying, to an electrical signal pulse waveform, a time-distributed signed electrical weighting function having negligible total weight, with alternations of sign of weights separated by intervals of the order of the width of the desired pulses.

20 Claims, 24 Drawing Figures

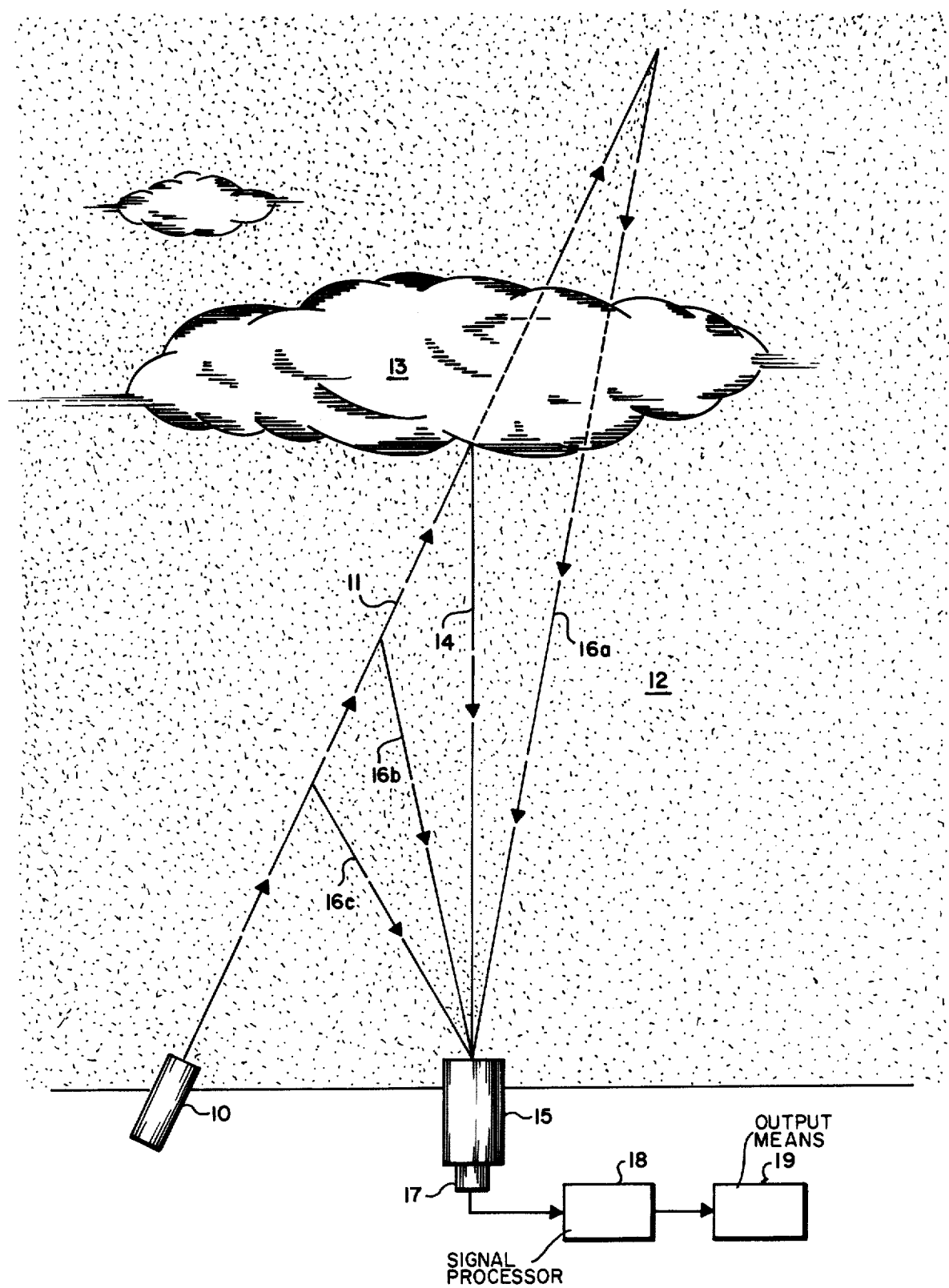

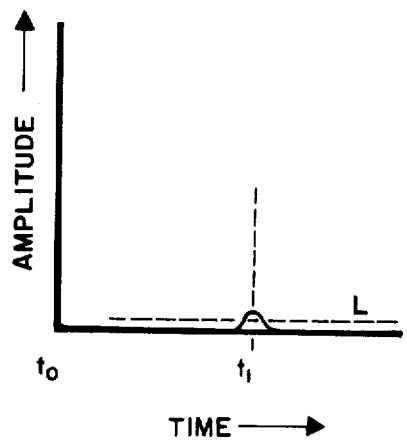
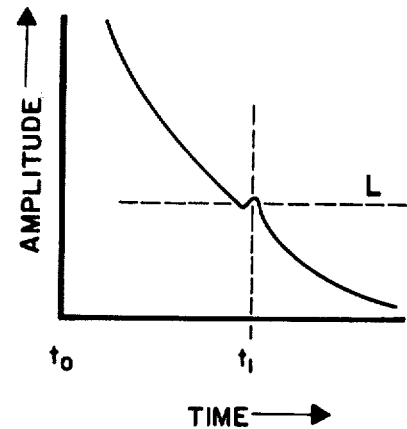
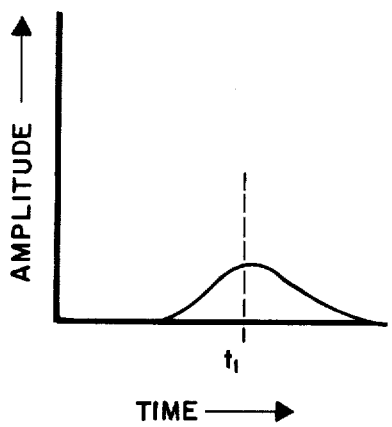
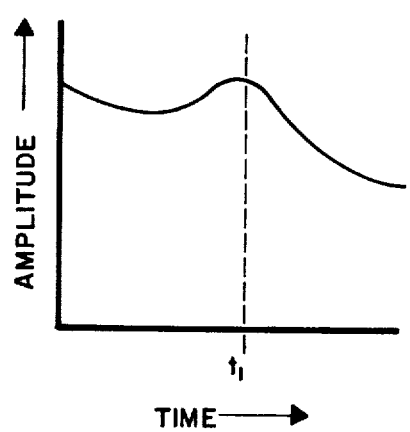

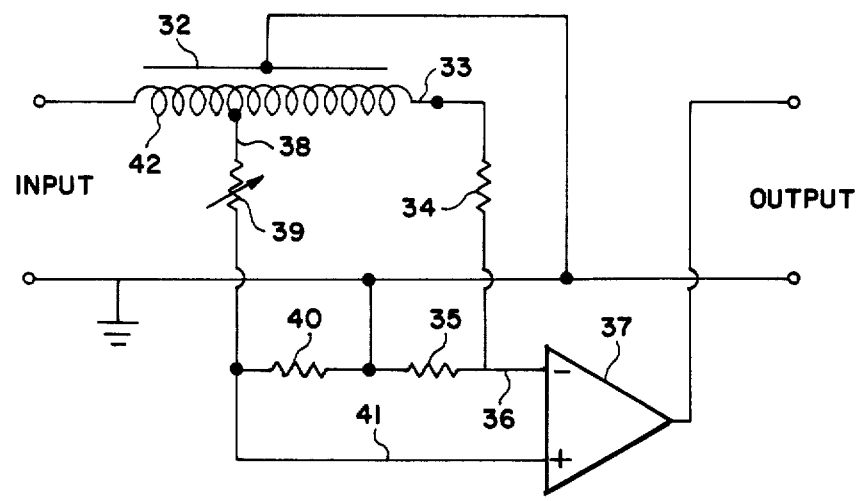
_Fig. 11_
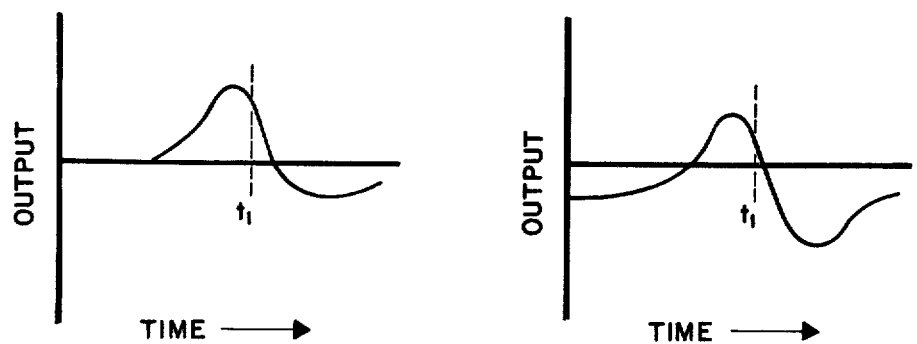
_Fig. 12a_   _Fig. 12b_

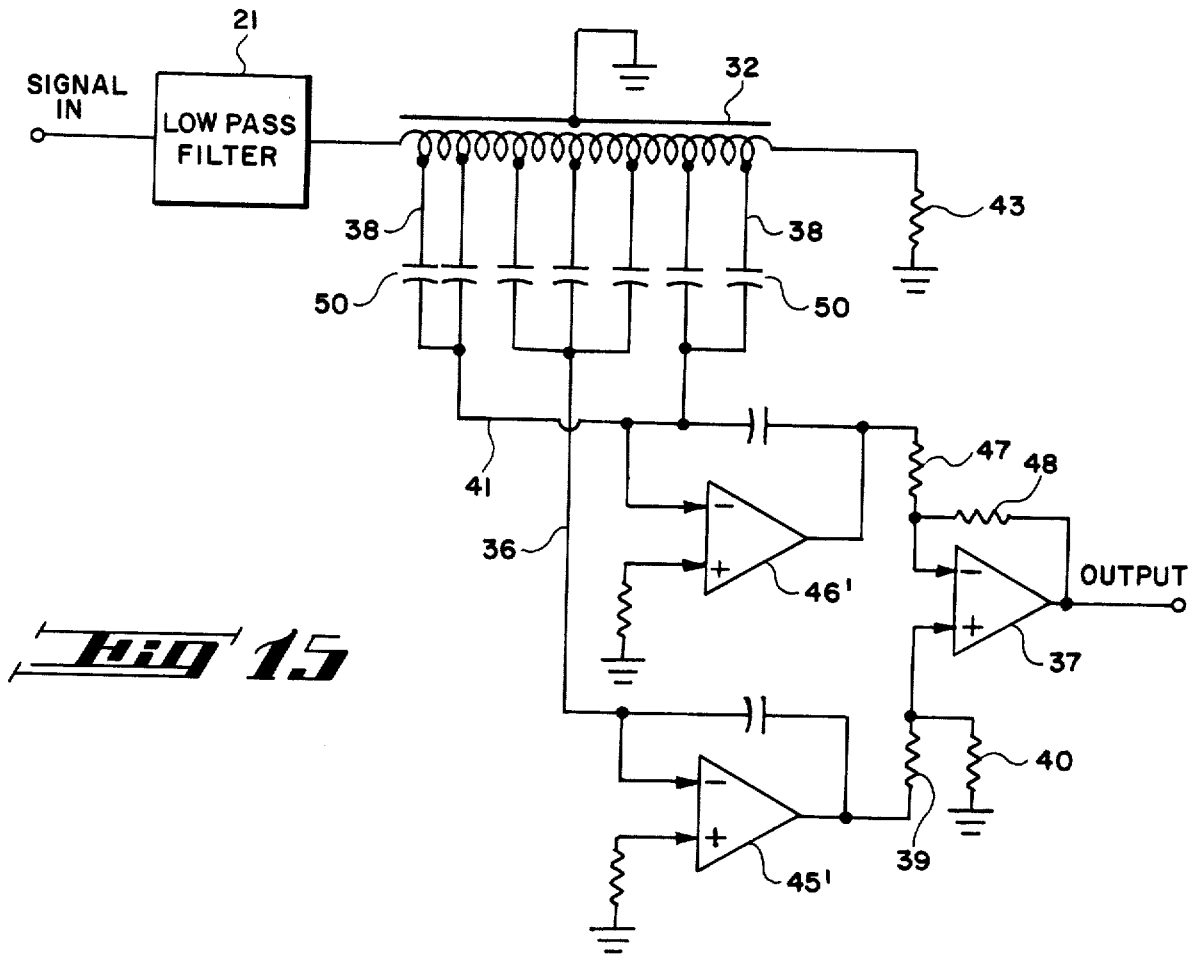
_Fig 15_
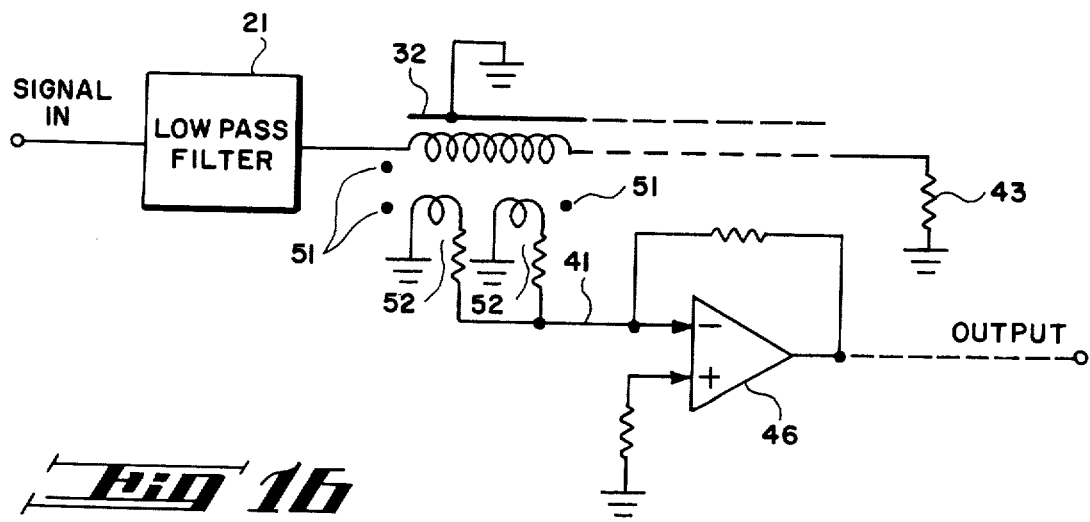
_Fig 16_

LASER CEILOMETER SIGNAL PROCESSING MEANS

BACKGROUND OF THE INVENTION

1. Field of the Invention

This invention relates to pulsed-laser lidars and range finders, and more particularly to pulsed-laser ceilometers, which are devices for measuring the height of clouds by measuring the time delay between the transmission of an upwardly projected short laser pulse and the reception of the backscattered return pulse from the underside of the cloud deck.

2. Prior Art Problem

A major problem in the application of laser ceilometers is their deficient performance in measuring cloud height under conditions of poor visibility such as if frequently encountered in fog, rain, heavy haze, sleet or snow. Not only does the poor visibility lead to a reduced signal level from the clouds but, more importantly, the backscattered signal from the visibility-reducing suspended particles can be large compared to the backscattered signal from the cloud deck, and can thus confound detection of the latter. A similar problem attends the use of other forms of pulsed-laser lidar, sensing targets through turbid media, but for simplicity the following disclosure will refer to pulsed-laser ceilometers.

SUMMARY OF THE INVENTION

An object of this invention is to provide signal-processing circuit means which can effectively separate desired backscattered cloud pulse signals from undesired backscattered signals from suspended particles.

A further object of this invention is to improve detection of cloud pulse signals when weakened by poor visibility. According to this invention, advantage is taken of an observed characteristic of such backscattered signals: that the undesired backscattered signal, from suspended particles alone, exhibits a generally-decreasing amplitude following each transmitted laser pulse, while the desired backscattered cloud signal pulse produces a non-decreasing signal interval in the total backscattered signal from both the cloud and the visibility-reducing suspended particles. There are described signal-processing circuit means, both analog and digital, which exploit this characteristic. Such signal-processing circuit means exhibit enhanced response to non-decreasing signal intervals of duration comparable to that of a backscattered cloud signal, and exhibit greatly diminished response to other signal components. According to this invention, such enhanced response is achieved by applying, to the electrical signal representing the total backscattered signal from both the cloud and the visibility reducing suspended particles, a time-distributed electrical signal weighting function having negligible total weight, with alternations of sign of weights separated by intervals of the order of the width of the desired backscattered cloud signal pulse.

BRIEF DESCRIPTION OF THE DRAWINGS

In the accompanying drawings, FIG. 1 is a schematic diagram of a pulsed-laser ceilometer system;

FIGS. 2a and 2b depict typical time-varying ceilometer detector output signals under, respectively, conditions of good and poor visibility;

FIGS. 3a and 3b show, in expanded form, those portions of the signals depicted in FIGS. 2a and 2b, in the neighborhood of the time of arrival $t_1$ of the backscattered cloud signal;

FIG. 11 is a block diagram of a further simple analog signal processing means according to this invention;

FIGS. 12a and 12b depict the output waveforms from the means of FIG. 11, under conditions of respectively good and poor visibility;

FIG. 15 is a block diagram of an analog signal processing means illustrating weighting by capacitive coupling;
and FIG. 16 is a fragmentary block diagram of a further analog signal processing means illustrating weighting by magnetic coupling.

DETAILED DESCRIPTION

Figure 4:
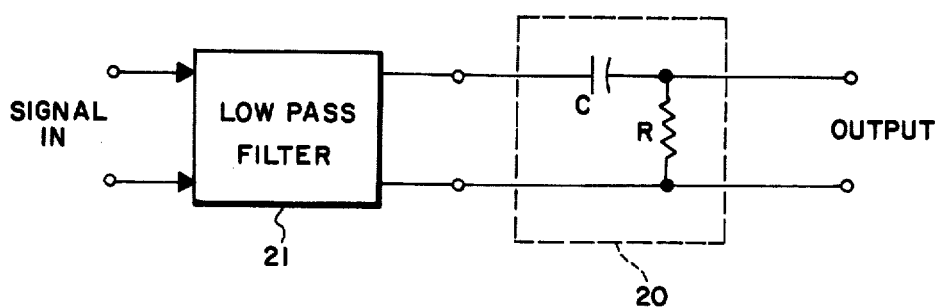
FIG. 4 is a block diagram of a simple analog signal processing means according to this invention.

Reference is made to FIG. 1, which is a schematic diagram of a pulsed-laser ceilometer system, comprising a pulsed-laser source 10 which projects a pulsed-laser beam 11 upwardly through a distribution 12 of suspended particles which may constitute a haze, fog or the like. Some of beam 11 is scattered by distribution 12 and the remainder continues upwardly to impinge upon and be scattered by cloud deck 13 or other target. Some of the beam scattered by cloud deck 13 returns along path 14 and is collected by receiver 15 as target return radiation. Some of the beam scattered by particle distribution 12 returns along various paths such as 16a, 16b and 16c, and is collected as background return radiation. The superimposed return radiations are applied to an electro-optical detector 17 in receiver 15 and are transduced to a corresponding signal pulse waveform which may be processed by electrical signal processing means 18 before application to an output means 19 which may typically be a cathode-ray display, a numerical readout of cloud height, a communications coupler, or other device for providing information concerning such cloud attributes as presence, height or density.

Reference is now made to FIG. 2a, which depicts a typical time-varying electrical signal from the electro-optical detector 17 of a pulsed-laser ceilometer viewing the backscattered laser light pulse return to a laser ceilometer viewing a cloud deck under conditions of good visibility. In the Figure, $t_0$ denotes the time at which the laser light pulse is projected upward toward the clouds and $t_1$ denotes the time at which the backscattered laser light pulse return is received. As is well-known in the art, the time difference $(t_1-t_0)$ may be used as a measure of the distance, or height, of the cloud deck, in the ratio of 150 meters per microsecond. For example, a fast digital counter in output means 19 could be started at time $t_0$ and stopped when the backscattered pulse return exceeds a suitably-chosen threshold level, in signal processing means 18, such as that denoted by L in the Figure, and the resulting counter content would be a measure of the height of the bottom of the cloud layer.

However, if reference is made to FIG. 2b, which depicts the time-varying signal under a typical condition of poor visibility, it can be seen that the addition of a strong backscattered signal due to suspended particles can complicate the problem of choosing a suitable threshold logic and level, especially since the amount of backscattered due to suspended particles cannot be predicted. An elevated threshold level, such as that denoted by L in FIG. 2b, would suffice for only a limited range of density of suspended particles, and not for the case of good visibility depicted in FIG. 2a.

We have found some characteristics of such superimposed backscatter signals which we can exploit: first, the signal due to suspended particles is generally decreasing in time during the return, and exhibits no increasing or non-decreasing intervals of duration comparable to the duration of the laser pulse. These characteristics are due to the usual fall-off of ceilometer return pulse strength with distance, to the optically diffuse nature of the boundaries of masses of suspended particles, and to the small size of groups of such particles compared to the ceilometer pulse resolution. Second, we have found that the backscattered cloud signal almost invariably produces a non-decreasing interval, of duration of the order of that of the laser pulse, in the total backscattered signal. In most cases, the cloud signal produces a increase in the total signal, followed by a decrease which can typically be to a level below that of the backscatter from just the suspended particles.

Figure 5A:
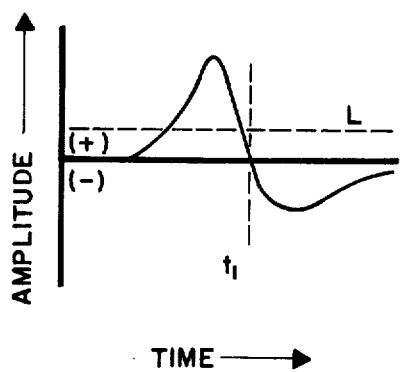
FIGS. 5a and 5b depict the output waveforms from that means, under conditions of respectively good and poor visibility.
Figure 5B:
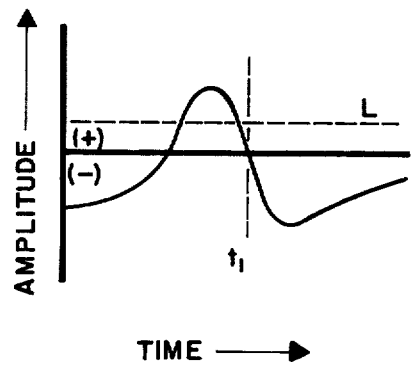

Reference is now made to FIGS. 3a and 3b which show respectively, in expanded form, those portions of the typical signals depicted in FIGS. 2a and 2b, in the neighborhood of the time of arrival, $t_1$, of the maximum backscattered signal from the cloud deck. If these signals are applied as electrical inputs to the electrical network depicted in FIG. 4, the RC quasi-differentiator 20 transforms them respectively into the electrical output waveforms shown in FIGS. 5a and 5b. It is clear that both of the output waveforms cross a suitably-chosen non-negative or slightly positive threshold level L at times closely preceding the time $t_1$ representing the maximum cloud return, and that such crossing can be processed, as by stopping a fast digital counter which was started at the time of the transmitted pulse, to yield a measure of the height of the bottom of the cloud deck.

Since the output of electro-optical detectors often contains high-frequency noise components, especially when strongly amplified, and since differentiators accentuate such high-frequency noise, we prefer to use a low-pass filter 21 in connection with quasi-differentiator 20, to reduce the high-frequency noise. The cutoff frequency of filter 21 should be chosen to be just above the major part of the frequency spectrum of the expected cloud signal pulses, of the order of the reciprocal of the pulse duration. The time constant of the RC quasi-differentiator should be of the order of the width of the cloud signal pulses, in order to respond to those pulses adequately without responding strongly to the wider signal due to suspended particles. Other forms of electrical signal differentiators, such as those based upon operational amplifiers, are more tolerant of RC time constant, but are more complex.

Figure 6:
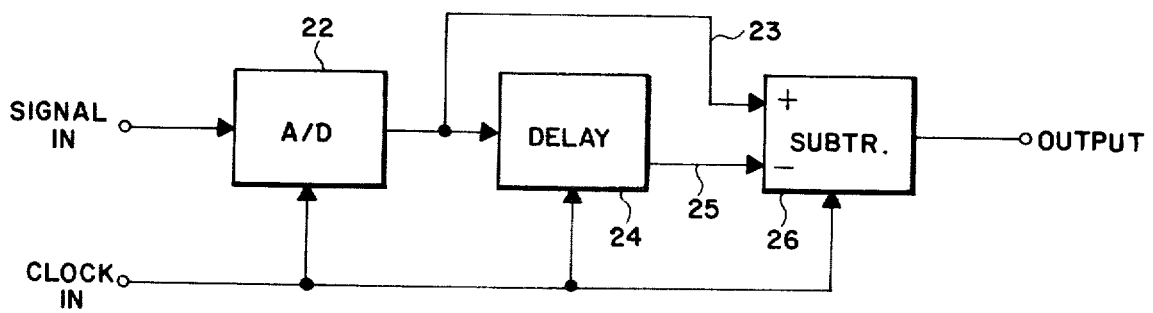
FIG. 6 is a block diagram of a simple digital signal processing means according to this invention.
Figure 7A:
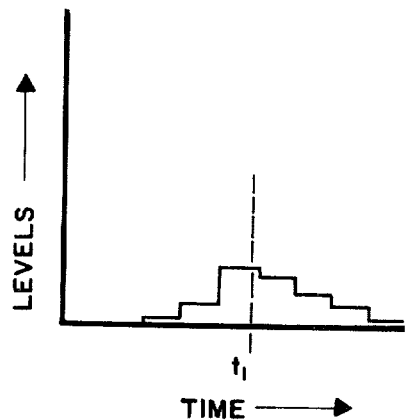
FIGS. 7a and 7b depict the levels of the digital input sample values under conditions of respectively good and poor visibility.
Figure 7B:
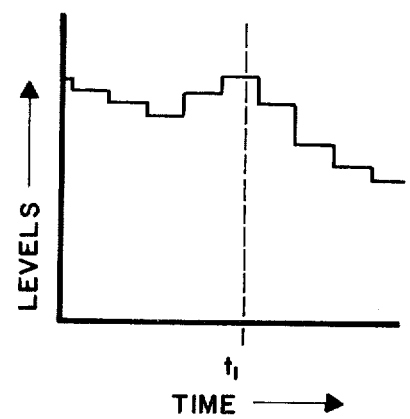
Figure 8A:
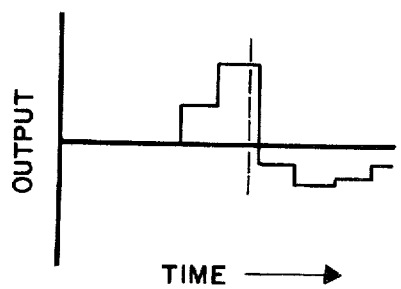
FIGS. 8a and 8b depict the corresponding levels of the digital output values.
Figure 8B:
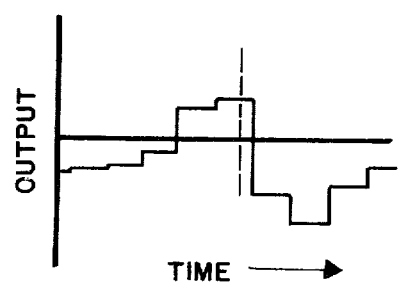

Referring now to FIG. 6, if the signals depicted respectively in FIGS. 3a and 3b are applied as input to a fast clocked analog-to-digital converter 22, the resulting digital sample values on parallel bus 23 may be symbolized by the discrete levels depicted respectively in FIGS. 7a and 7b. The same values, delayed by one clock period in parallel digital delay 24 and presented on parallel bus 25, are offset by one clock period from those depicted in FIGS. 7a and 7b. Parallel bus 23 and parallel bus 25 are connected as electrical signal nodes to the inputs of parallel digital subtractor 26 which subtractively combines the digital sample values to yield an output which is the difference between successive digital sample values and which can be symbolized by the discrete levels depicted in expanded form respectively in FIGS. 8a and 8b. Here it is clear that a suitable digital thresholding operation can yield a crossing representing reception of the arrival of the backscattered signal from the bottom of the cloud deck. It is also clear that the clocked sample period should not be much greater than the total width of the expected cloud signal pulses and preferably of the order of the half-amplitude or effective width, or somewhat less, in order to respond to those pulses adequately without responding strongly to either the wider signal due to suspended particles or to high-frequency noise in the amplified signal from the electro-optical detector.

Figure 9:
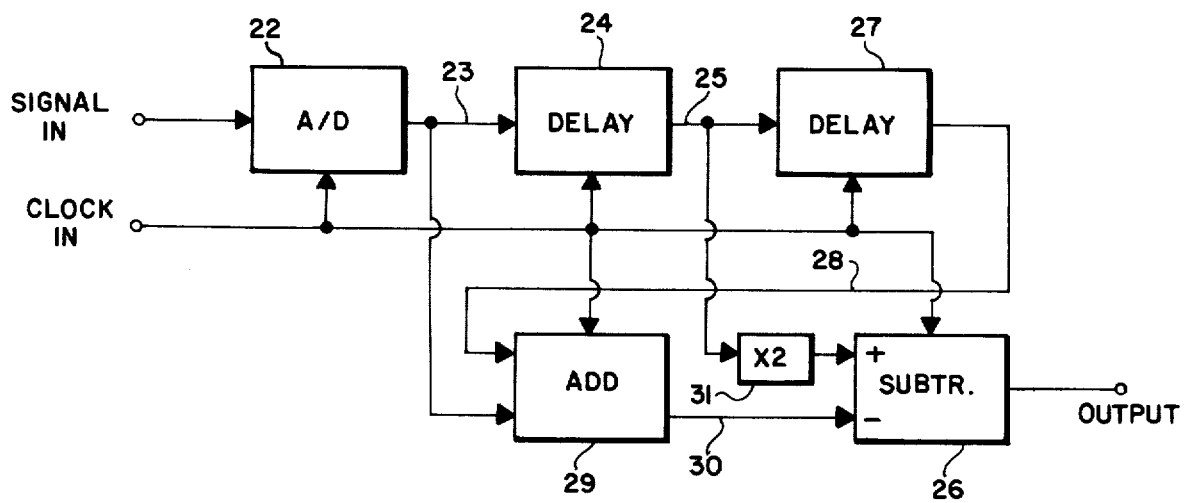
FIG. 9 is a block diagram of an augmented digital signal processing means according to this invention.
Figures 10A, 10B:
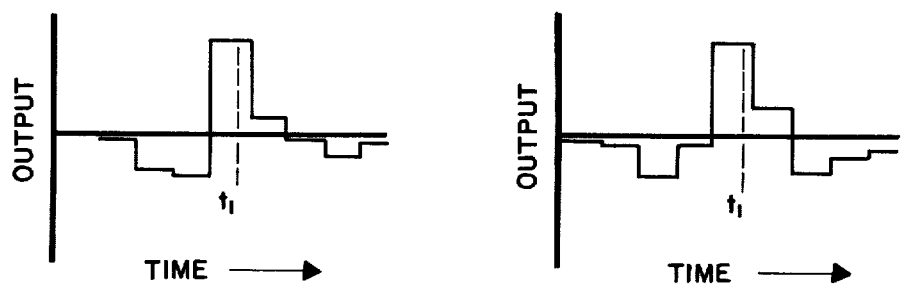
FIGS. 10a and 10b depict the levels of the digital output values under the two conditions of respectively good and poor visibility.

If the electrical network previously shown in FIG. 6 is augmented as shown in FIG. 9, somewhat improved performance may be obtained. Here, a second parallel digital delay 27 presents sample values delayed by two clock periods on parallel bus 28. Parallel digital adder 29 adds the undelayed and doubly delayed values and presents the sum on parallel digital bus 30 which is connected as an electrical signal node to one input of parallel digital subtractor 26. Simultaneously, the singly delayed values are passed through digital doubling means 31, which may merely be an offset of one place in connecting wires carrying binary-coded values, to the electrical signal node connected to the other input of parallel digital subtractor 26. Thereby, subtractor 26 yields an output which is the difference between twice the singly-delayed value and the sum of the contiguous values and which can be symbolized by the discrete levels depicted respectively in FIGS. 10a and 10b. Here it is clear that the more symmetric output sequence exhibits diminished response to the background component of the signal pulse waveform and may readily be treated by a digital thresholding operation.

Reference is now made to FIG. 11, which depicts a further simple analog electrical signal-processing means utilizing an electrical delay line to achieve the necessary time-distributed weighting function. Signals such as those depicted in FIGS. 3a and 3b are applied to the input of a tapped analog delay line 32 terminated in its characteristic impedance at output terminal 33 by the series combination of resistors 34 and 35. Electrical signal node 36, at the junction of weighting resistors 34 and 35, is connected to an input terminal, of one polarity, of differential amplifier 37, which is thereby provided with a correspondingly weighted portion of the delayed signal from output terminal 33. A weighted portion of the less-delayed signal from delay line tap 38 appears at electrical signal node 41, at the junction of weighting resistors 39 and 40, and is provided to the other input terminal, of opposite polarity, of differential amplifier 37, the output of which is therefore proportional to the algebraic sum of the oppositely-signed, weighted, and differently-delayed, inputs.

An initial section 42 of delay line 32, between the input terminal and tap 38, serves two purposes: to act as a low-pass filter to remove high-frequency noise components, above the frequency spectrum of the expected signal pulse, and also to attenuate before arrival at tap 38, signal frequency components which are near the delay line cutoff frequency and are therefore subject to distortion by time dispersion.

If the signals applied to this signal processing means are as depicted in FIGS. 3a and 3b, if equal weights are applied to the signals appearing at electrical signal nodes 36 and 41, and if the time interval of the delay between tap 38 and output terminal 33 is of the order of the effective width of the target signal pulse, the output signals will be, respectively, as depicted in FIGS. 12a and 12b. They resemble those depicted in FIGS. 5a and 5b as output signals from the signal processing network depicted in FIG. 4.

In order that the output may exhibit diminished response to broad waveforms such as those due to suspended particles, it is required that equal effective weights be applied to the differently-delayed signals applied to the opposed-polarity inputs of differential amplifier 37. Looking at the process from the vantage point of the output of that amplifier, this is equivalent to a requirement that the algebraic total of the two time-distributed sign electrical weights be effectively zero. While resistor 39 can be adjusted to compensate for delay line attenuation, amplifier unbalance and the like, mathematically exact zero total signed weight is impossible. It suffices that the total of the signed weights be negligible, meaning that the effects of their imbalance be imperceptible in the context of effects of signal noise, threshold margins and the like. It is in this sense that the term "negligible" is to be construed in this disclosure.

The four preceding simple examples of signal processing means, analog and digital, are members of a general class of means which we have found to possess the capability of responding adequately to non-decreasing signal intervals of width comparable to the width of an expected target signal pulse, embedded in a generally-decreasing background signal. Means of this class have the property of applying, to the input signal, a time-distributed signed weighting function having negligible total weight within a time interval which can contain the expected electrical signal pulse waveform. And members of this class have the further property that alternations of sign of that time-distributed weighting function are separated by time intervals of the order of the width of the expected target signal pulse.

Figure 13:
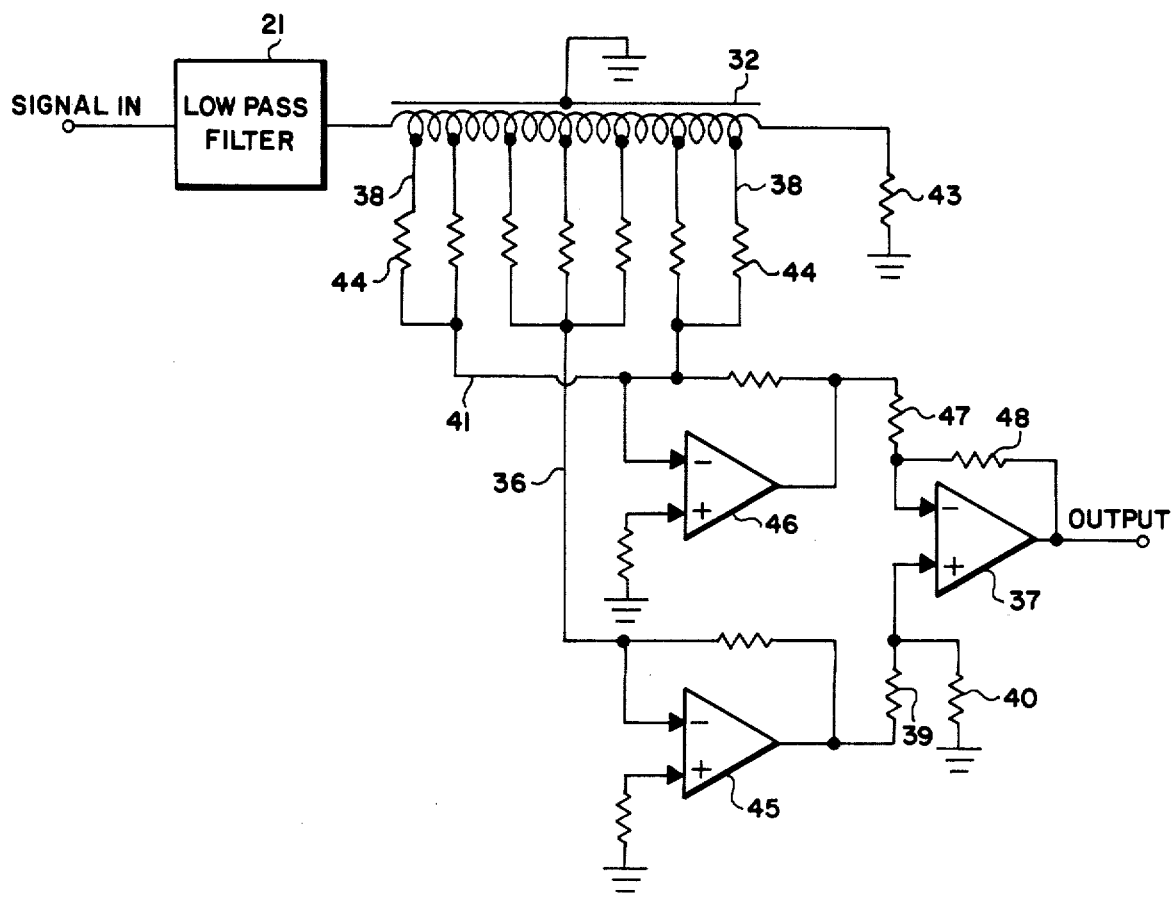
FIG. 13 is a block diagram of a somewhat more complex analog signal processing means.

Reference is now made to FIG. 13 which is a block diagram of a somewhat more complex analog signal processing means according to this invention. The signal input is applied to low-pass filter 21, the output of which is connected to tapped analog delay line 32 which is terminated in its characteristic impedance by terminating resistor 43. Delay line 32 is provided with a plurality of taps 38 which are connected to weighting resistors 44, the conductances of which, suitably adjusted to compensate for the attenuation of the signals passing along delay line 32, provide currents to electrical signal nodes 36 and 41 in proportion to the time-distributed weights to be applied to the signal sequence. These currents are applied as input to conventional current-to-voltage summing amplifiers 45 and 46, the voltage outputs of which are applied as inputs to conventional differential amplifier 37 through the adjustable voltage divider provided by resistors 39 and 40, and through input and feedback resistors 47 and 48. The values of weighting resistors 44, in the context of the attenuation along delay line 32, the relative gains of summing amplifiers 45 and 46, and the values of resistors 39, 40, 47, and 48 are so selected and adjusted that the effective total of the time-distributed signed weights applied to the signal pulse waveform is negligible; that is, the residual imbalance in the total is imperceptible in the context of other real disturbances, noise, drift and threshold margins. With such an adjustment, steady or slowly varying signal pulse waveforms yield little or no output. Taps 38 along delay line 32, and the grouping of weighting resistors 44 connected to nodes 36 and 41, are selected to separate alternations of the sign of the summed time-distributed weighting function by time intervals of the order of the width of the expected signal pulse. Low-pass filter 21 serves two purposes: It not only removes high-frequency noise components above the frequency spectrum of the expected signal pulse, but it also prevents application, to delay line 32, of frequencies above those which the delay line can transmit without time dispersion.

Figure 14A:
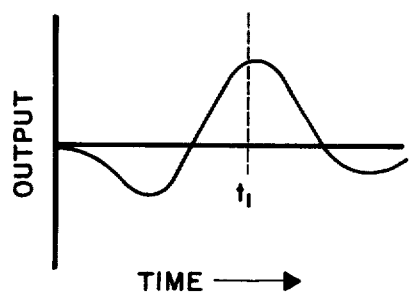
FIGS. 14a and 14b depict the output waveforms of that means under the same conditions of respectively good and poor visibility.
Figure 14B:
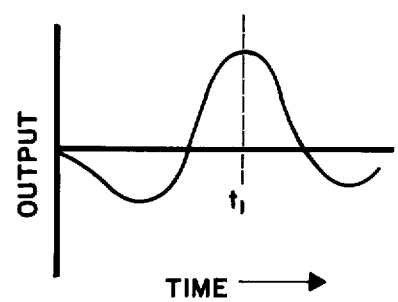

If the delay per tap of delay line 32 is chosen to be of the same order as the sampling periods shown and described with respect to the digital embodiments of this invention, it is clear that alternation of sign of the weights should occur at spacings of the order of two or three taps, for the expected signal pulses depicted in the Figures; such a choice of signs is shown in FIG. 13. If for example, the sequence of relative weights is chosen to be $-0.4, -0.8, +0.7, +1.0, +0.7, -0.8, -0.4$, input signals of the forms shown in FIGS. 3a and 3b will be processed into the output signal forms shown, respectively, in FIGS. 14a and 14b. These output signals, representing the performance of the device under conditions of respectively good and poor visibility, are quite similar to each other, indicating enhanced response to the non-decreasing signal component denoting the cloud signal pulse and greatly diminished response to the other signal components. Therefore the device will effectively separate desired cloud pulse signals from undesired back-scattered signals from suspended particles. And by permitting sensitive thresholding very close to signal baseline, it will also improve detection of cloud pulse signals when weakened by poor visibility.

When the number of delay line taps is reasonably large, such as the seven shown in FIG. 13, it will be found that fairly coarsely-quantized values of weighting will yield almost as good results as finely-quantized values. For example, the binary-quantized sequence $\{-\frac{1}{2}, -1, +1, +1, +1, -1, -\frac{1}{2}\}$ can yield good results. Such a binary sequence may also be easily implemented in a digital signal processing means which is a further augmentation of that shown in FIG. 9.

As is well-known to those skilled in the art, a number of alterations and substitutions of components can be made in the embodiments of this invention without departing from the teaching thereof. For example, the electromagnetic delay line 32, shown as a component in FIG. 13, could be replaced by a surface-acoustic-wave analog delay device or by a solid-state tapped discrete analog memory device of the charge-coupled device (CCD) or bucket-brigade-device (BBD) types. Or, as another example, the weighting resistors 44 in that Figure, the conductances of which provide weighted currents as inputs to current-to-voltage amplifiers 45 and 46, could be replaced as shown in FIG. 15 by weighting capacitors 50 the susceptances of which would provide weighted charges as inputs to amplifiers 45 and 46, which would correspondingly be reconfigured as charge-to-voltage amplifiers 45' and 46'. If delay line 32 is configured in the conventional form of a long solenoidal winding, such weighting capacitors 50 may be merely insulated conductive patches applied to the outside of the winding; in the limit of very many weighted taps, this construction becomes one or more shaped conductive patches, of width corresponding to electrical weight at the tap locations.

In the devices shown in FIG. 11 and FIG. 13, the functions of weighting, combining and differencing are logically linear and therefore, as is well-known to those skilled in the art, are commutative and may be performed in various orders. For example, as illustrated in FIG. 16, the sign of the individual weights of the time-distributed electrical weighting function may be determined by the sense, indicated by conventional dot rotation 51, of magnetic couplings 52 to the delay line 32, so that only one electrical signal node 41 would be required. For another example, one electrical circuit could be employed to apply a negligible total weight to the input signal and a second electrical circuit could provide the necessary time-separated alternations of sign of weighting; such an arrangement could employ circuits having the configurations shown in FIG. 4 and FIG. 11.

The signal processing means of the present invention has been described in the context of a laser ceilometer. It will be clear to those skilled in the art that the teaching of this invention can be applied to devising signal processing means for analogous applications, where it is desired to separate the backscattered light pulse due to a discrete target from a strong backscattered return due to distributed scatterers. Typical examples of such applications are laser lidars for use under conditions of poor visibility, and laser bathymeters or depth sounders for use in waters having turbidity. As a common term of reference, it is convenient to refer to all of these devices as laser lidars.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

We claim:

1. In a pulsed-laser lidar, comprising a pulsed laser source for projecting toward a target a pulsed laser beam through a turbid medium bearing a distribution of suspended particles;
  radiation collector means for gathering target return radiation scattered from the pulsed laser beam by the target, superimposed upon background return radiation scattered from the pulsed laser beam by the distribution of suspended particles;
  electro-optical detector means for receiving said superimposed return radiations gathered by said collector means and transducing said superimposed return radiations to a corresponding electrical signal pulse waveform comprising a target signal pulse, from received and transduced target return radiation, superimposed upon a background signal waveform, from received and transduced background return radiation; and
  output means for receiving and presenting said electrical signal pulse waveform as a measure of at least one target attribute such as presence, range or magnitude, the improvement comprising:
    electrical signal processing means, intermediate said electro-optical detector means and said output means, said electrical signal processing means applying, to said electrical signal pulse waveform, a time-distributed signed electrical weighting function having negligible total weight within a total time interval which can contain said electrical signal pulse waveform and said time-distributed signed electrical weighting function having alternations of sign separated by time intervals of the order of the width of said target signal pulse.

2. An improved pulsed-laser lidar according to claim 1 in which said electrical signal processing means comprises:
  (a) input terminal means receiving said electrical signal pulse waveform from said electro-optical detector means;
  (b) at least one electrical signal node, within said electrical signal processing means, for connecting electrical signals;
  (c) analog signal delay means, receiving said electrical signal pulse waveform from said input terminal means, and having a total time delay at least as great as the duration of said target signal pulse;
  (d) a plurality of taps connected to said analog signal delay means at a corresponding plurality of locations, along said analog signal delay means, at which said electrical signal pulse waveform is delayed by a corresponding plurality of time-distributed time delays within said total time delay, each said tap extracting a sample of said electrical signal pulse waveform delayed by one of said corresponding plurality of time-distributed time delays;
  (e) a plurality of electrical winding elements corresponding to said plurality of taps, each said electrical weighting element receiving an extracted sample from a corresponding one of said plurality of taps, applying to said extracted sample a corresponding one of a plurality of time-distributed signed electrical weights, and providing one of a corresponding plurality of time-distributed signed and weighted samples as an electrical signal to said at least one signal node;
  (f) combining means, electrically connected to said at least one signal node, for algebraically combining said time-distributed signed and weighted samples so that the algebraic total of said time-distributed electrical weights is negligible and the alternations of sign, of said time-distributed signed electrical weights, are separated by time intervals of the order of the width of said target signal pulse; and
  (g) output terminal means for receiving said algebraically-combined time-distributed signed and weighted samples and providing an output signal to said output means.

3. An improved pulsed-laser lidar according to claim 2 wherein:
  (a) said at least one signal node comprises a first signal node and a second signal node;
  (b) said extracted samples have a common electrical polarity;
  (c) a portion of said plurality of electrical weighting elements corresponds to electrical weights of a first sign and provides time-distributed weighted samples of said common electrical polarity as an electrical signal to said first signal node;
  (d) a portion of said plurality of electrical weighting elements corresponds to electrical weights of a second sign opposite to said first sign and provides time-distributed weighted samples of said common electrical polarity as an electrical signal to said second signal node; and
  (e) said combining means is connected to said first and second signal nodes and subtractively combines said electrical signals provided to said first and second signal nodes.

4. An improved pulsed-laser lidar according to claim 2 wherein said analog signal delay means comprises a solid-state tapped discrete analog memory device of the charge-coupled-device or bucket-brigade-device types.

5. The improved pulsed-laser lidar according to claim 2 wherein said analog signal delay means comprises a surface-acoustic-wave analog delay device.

6. An improved pulsed-laser lidar according to claim 2 wherein said analog signal delay means comprises a tapped electromagnetic delay line.

7. An improved pulsed-laser lidar according to claim 6 wherein said taps, upon said tapped electromagnetic delay line, are conductive connections to delay line elements at locations, along said delay line, corresponding to said plurality of time-distributed delays.

8. An improved pulsed-laser lidar according to claim 6 wherein said taps, upon said tapped electromagnetic delay line, are magnetic couplings to magnetic fluxes at locations, along said delay line, corresponding to said plurality of time-distributed time delays.

9. An improved pulsed-laser lidar according to claim 8 wherein each said magnetic coupling has magnetic sense corresponding to the sign of the electrical weight to be applied to the extracted sample at the corresponding tap.

10. An improved pulsed-laser lidar according to claim 6 wherein said taps, upon said tapped electromagnetic delay line, are conductive bodies electrostatically coupled with electrical fields at locations, along said delay line, corresponding to said plurality of time-distributed delays.

11. An improved pulsed-laser lidar according to claim 10 wherein said electromagnetic delay line has a distributed structure and said conductive bodies comprise at least one body shaped to provide distributed electrostatic coupling, with said delay line, proportional to the electrical weights to be applied to extracted samples at locations along said delay line.

12. An improved pulsed-laser lidar according to claim 1 in which said electrical signal processing means comprises:
  (a) input terminal means receiving said electrical signal pulse waveform from said electro-optical detector;
  (b) analog-to-digital converter means for receiving said electrical signal pulse waveform from said input terminal means, repetitively deriving analog samples of contemporaneous values of said electrical signal pulse waveform at intervals of a sampling period, and converting said analog samples into corresponding digital sample representations of said analog samples;
  (c) digital delay means, said means having a digital sample input bus for receiving said digital sample representations from said analog-to-digital converter means, delaying said digital sample representations by at least one discrete multiple of said sampling period, and presenting said delayed digital sample representations upon a corresponding at least one digital sample delayed output bus;
  (d) a plurality of digital weighting means connected to said digital sample input bus and to said at least one digital sample delayed output bus, each digital weighting means applying, to the digital sample representations upon its corresponding bus, a corresponding time-distributed signed digital weighting factor, and providing said weighted time-distributed signed digital sample representations to at least one digital signal node;
  (e) digital combining means connected to said at least one digital signal node, for algebraically combining said weighted time-distributed signed digital sample representations so that the algebraic total of said time-distributed signed digital weighting factors is negligible, and the alternations of sign, of said time-distributed signed digital weighting factors, are separated by time intervals of the order of the width of said target signal pulse; and
  (f) a digital signal output bus receiving said algebraically-combined weighted time-distributed signed digital sample representations and providing a digital output signal to said output means.

13. An improved pulsed-laser lidar according to claim 12 wherein:
  (a) said at least one digital signal node comprises a first digital signal node and a second digital signal node;
  (b) said digital delay means delays said digital sample representations by one discrete multiple of said sampling period and presents delayed digital sample representations upon one digital sample delayed output bus, said discrete multiple of said sampling period having a time magnitude of the order of the width of said target signal pulse;
  (c) said plurality of digital weighting means comprises a first digital weighting means and a second digital weighting means;
  (d) said first digital weighting means is connected to said digital sample input bus, applies a first digital weighting factor of predetermined absolute value to said digital sample representations, and provides weighted digital sample representations to said first digital signal node;
  (e) said second digital weighting means is connected to said digital sample delayed output bus, applies a second digital weighting factor of said predetermined absolute value to said delayed digital sample representations, and provides weighted delayed digital sample representations to said second digital sample node; and (f) said digital combining means algebraically combines said weighted representations provided to said first and second digital sample nodes.

14. An improved pulsed-laser lidar according to claim 13 wherein said first and second digital weighting factors are of the same algebraic sign, and said digital combining means subtractively combines said weighted representations provided to said first and second digital sample nodes.

15. An improved pulsed-laser lidar according to claim 13 wherein said first and second digital weighting factors are of opposite algebraic sign, and said digital combining means additively combines said weighted representations provided to said first and second digital sample nodes.

16. An improved pulsed-laser lidar according to claim 12 wherein said time-distributed signed digital weighting factors have absolute values the ratios between which are simple binary values.

17. An improved pulsed-laser lidar according to claim 1 in which said electrical signal processing means comprises an electrical signal differentiator.

18. An improved pulsed-laser lidar according to claim 17 in which said electrical signal differentiator is an RC quasi-differentiator having a time constant of the order of the width of the said target signal pulse.

19. An improved pulsed-laser lidar according to claim 1 further comprising, in said electrical signal processing means, a low-pass electrical filter having a cut-off frequency just above the major part of the frequency spectrum of the said target signal pulse.

20. An improved pulsed-laser lidar according to claim 2 or claim 17 wherein:
(a) a first electrical circuit within said electrical signal processing means applies, to said electrical signal pulse waveform, a time-distributed electrical weighting function having negligible total weight within a total time interval which can contain said electrical signal pulse waveform; and
(b) a second electrical circuit within said electrical signal processing means, in series connection with said first electrical circuit, applies to said electrical signal pulse waveform, a time-distributed signal electrical weighting function having alternations of sign separated by intervals of the order of the width of said target signal pulse.

* * * * *